March 10, 1959 J. L. BUTLER 2,877,427
PARALLEL TRANSMISSION LINE CIRCUIT
Filed Oct. 11, 1955 3 Sheets-Sheet 1

Jesse L. Butler
INVENTOR.

Jesse L. Butler
*INVENTOR.*

Jesse L. Butler
*INVENTOR.*

United States Patent Office 2,877,427
Patented Mar. 10, 1959

2,877,427

PARALLEL TRANSMISSION LINE CIRCUIT

Jesse L. Butler, Nashua, N. H., assignor, by mesne assignments, to Sanders Associates, Inc., Nashua, N. H., a corporation of Delaware Application October 11, 1955, Serial No. 539,771

8 Claims. (Cl. 333—9)

The present invention relates to high frequency transmission lines. More particularly, the invention relates to parallel transmission line circuits as used in transmission lines utilizing planar conductors.

In transmission lines of the type utilizing a pair of outer planar conductors providing ground planes and an inner planar conductor held in insulated spaced relation between the outer conductors, there has been a problem of providing parallel circuitry without introducing extraneous reflections.

It is therefor an object of the present invention to provide an improved parallel transmission line circuit which presents a minimum discontinuity to energy propagated therethrough.

In accordance with the invention there is provided a parallel transmission line circuit comprising a pair of outer planar conductors providing ground planes. A main, inner, planar conductor is held in insulated, spaced relation between the outer conductors and is of such width as to provide a main transmission line having a first characteristic impedance. A first branch inner conductor is co-planar with and coupled to the main inner conductor to provide a first branch transmission line with a second characteristic impedance. A second branch inner planar conductor is co-planar with and coupled to the main inner conductor to provide a second branch transmission line with a third characteristic impedance. At least one of the branch inner conductors diverges from the main inner conductor. The virtual point of divergence of adjacent edges of the branch conductors precedes the point of divergence of an outer edge of the branch conductors to enable energy propagated in the main transmisison line to be divided between the branch transmission lines without introducing extraneous reflections.

For a better understanding of the present invention, together with other and further objects thereof, reference is made to the following description taken in connection with the accompanying drawings and its scope will be pointed out in the appended claims.

Figure 1:
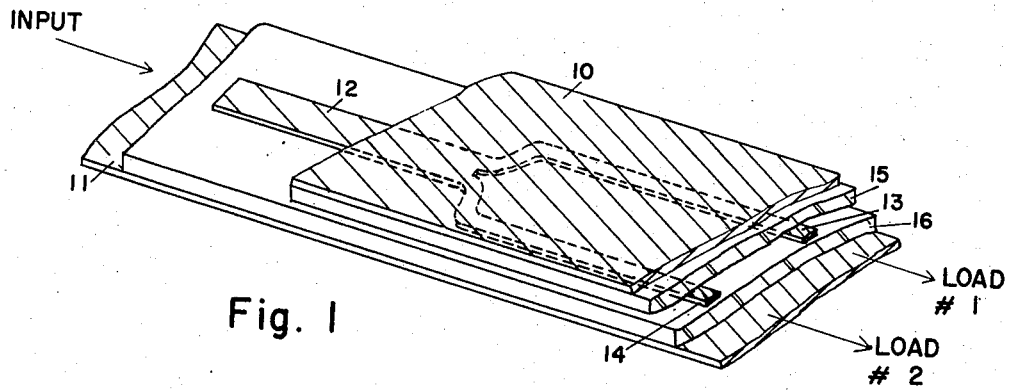
Fig. 1 is a three dimensional, partially fragmentary, partially sectionaly view of a parallel transmission line circuit embodying the present invention.
Figure 2:
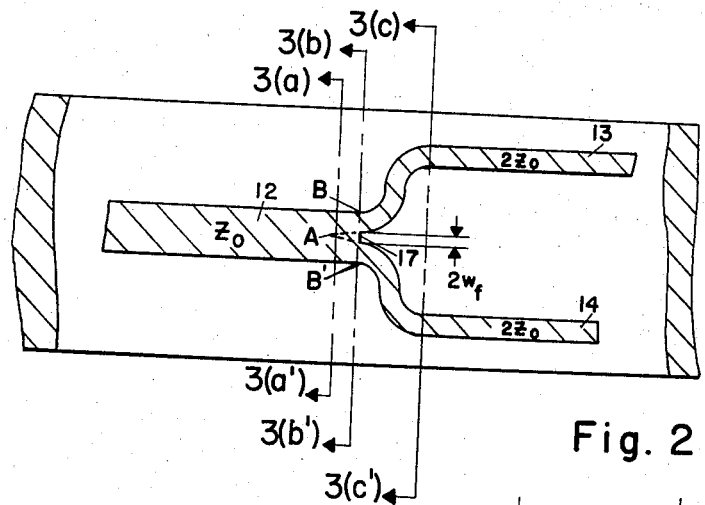
Fig. 2 is a plan view of a portion of the circuit in Fig. 1.
Figure 3A:
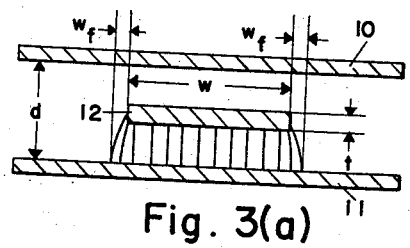
Figure 3B:
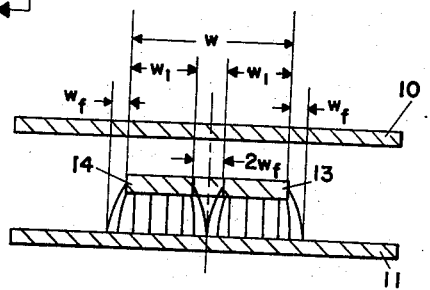
Figure 3C:
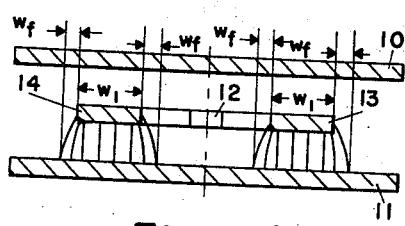
Figure 4:
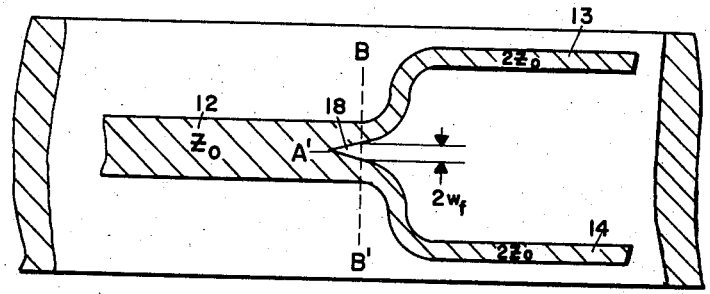
Figure 5:
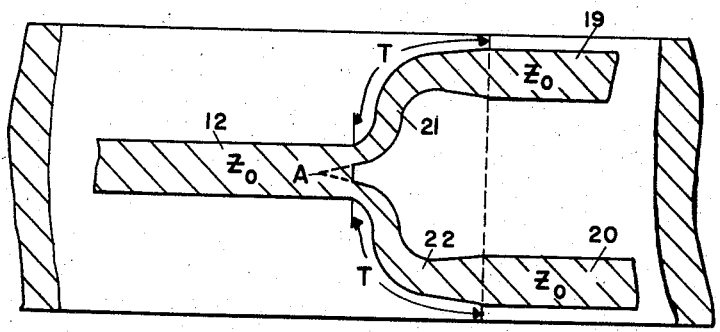
Figure 6:
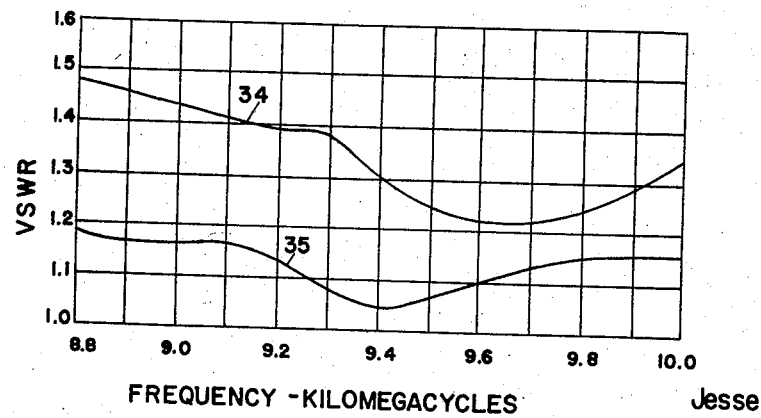
Figure 7:
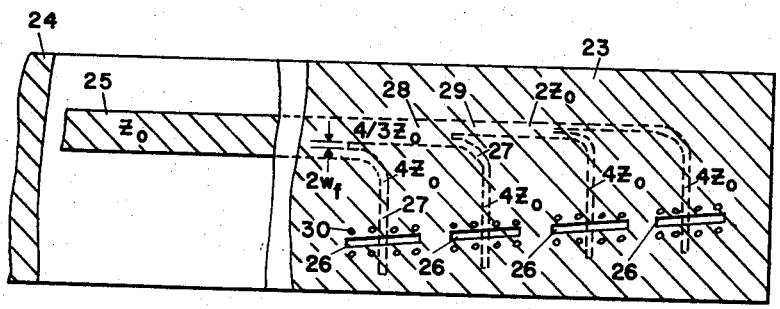
Figure 8:
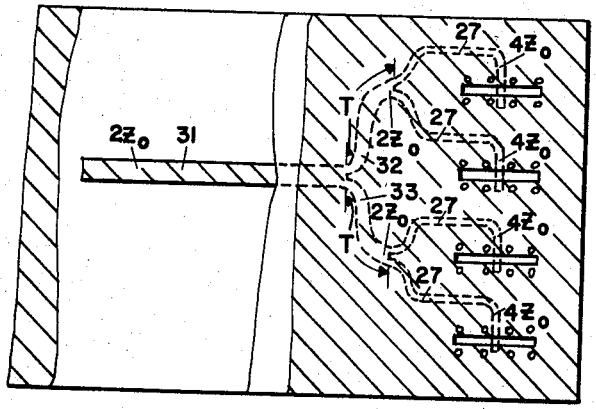

Figs. 3a, 3b and 3c are a series of enlarged, schematic, sectional views of the circuit in Fig. 1 taken along the lines 3(a)—3(a'), 3(b)—3(b'), and 3(c)—3(c') in Fig. 2;

Fig. 4 is a plan view of a portion of a transmission line circuit illustrating a modification of the embodiment in Fig. 1;

Fig. 5 is a plan view of a portion of a transmission line circuit illustrating a further modification of the embodiment in Fig. 1;

Fig. 6 is a graph illustrating an aspect of the operation of the invention;

Fig. 7 is a plan view, partially fragmentary, of an antenna system embodying the present invention; and Fig. 8 is a plan view, partially fragmentary, of a modification of the antenna system in Fig. 7.

For greater clarity, conductive surfaces are shown crosshatched in the drawings.

*Description and operation of the circuit in Figs. 1, 2 and 3*

Referring now to the drawings and with particular reference to Figs. 1–3, inclusive, a parallel transmission line circuit is here illustrated which comprises a pair of outer, planar conductors 10 and 11. A main, inner, planar conductor 12 is held in insulated, spaced relation between the outer conductors by a pair of dielectric insulating members 15 and 16. The conductor 12 is of such width as to provide a main transmission line having a first characteristic impedance $Z_0$. A first branch, inner conductor 13 is co-planar with and connected to the main inner conductor 12 as shown to provide a first branch transmission line with a second characteristic impedance $2Z_0$. A second branch, inner, planar conductor 14 is co-planar with and connected to the main inner conductor 12 to provide a second branch transmisison line with a third characteristic impedance $2Z_0$. The branch inner conductors 13 and 14 diverge from the main inner conductor as shown. The virtual point A of divergence of adjacent edges of the branch conductors 13 and 14 precede the points B and B' of divergence of the outer edges of the branch conductors as shown. The end of the conductor 12 and adjacent edges of the conductors 13 and 14 define a slot 17 as shown. The slot provides a spacing $2w_f$ along a line at B—B', the points of divergence of the outer edges of the branch inner conductors, between the connections of the main and the first branch conductors and the main and the second branch conductors. The spacing $2w_f$ is approximately twice the effective electrical width of capacitive fringing fields associated with the adjacent edges of the branch conductors 13 and 14 as will hereinafter be described in greater detail.

The electric field distribution between the inner conductor 12 and the outer conductor 11 is schematically illustrated in Fig. 3(a) for energy propagated in the well-known TEM mode. The characteristic impedance $Z_0$ associated with the inner conductor 12 is determined by its width $w$ plus twice the effective width $w_f$ of the associated capacitive fringing fields associated with the edge of the conductor. The fringing capacitance $C'_f$ in micro-microfarads per centimeter from one corner of the strip of the conductor 12 to its adjacent ground plane as provided by the outer conductor 11 is discussed by Seymour B. Cohn, "Problems in Strip Transmission Lines," vol. MTT–3, March 1955, #2, IRE Transactions on Microwave Theory and Techniques, page 119. The characteristic impedance $Z_0$ for transmission lines of the type described is expressed in the form:

(1) $$Z_0 = \frac{94.15}{\sqrt{\epsilon_r}\left(\dfrac{w/d}{1-t/d} + \dfrac{C'_f}{0.0885\epsilon_r}\right)} \text{ ohms}$$

where $w$=width of the inner conductor, e. g., conductor 12, $\epsilon_r$=dielectric constant of the insulating members, $d$=the spacing between the outer conductors 10 and 11 and $t$=the thickness of the inner conductor, e. g., conductor 12. The formula for $C'_f$ in the case of a semi-infinite plate between two infinite ground planes is:

(2)
$$C'_f = \frac{0.0885\epsilon_r}{\pi}\left\{\frac{2}{1-t/d}\log_e\left(\frac{1}{1-t/d}+1\right)-\left(\frac{1}{1-t/d}-1\right)\log_e\left[\frac{1}{(1-t/d)^2}-1\right]\right\}\text{micro-microfarads per centimeter}$$

One can obtain an expression for $w_f$ in terms of distance $d$ between the outer conductors 10 and 11 in the following way: let $$C''_f = \frac{C'_f}{0.0885\epsilon_r}$$

and assume the thickness $t$ of the conductor 12 to be 0. Then Equation 1 reduces to:

(3) $\quad Z_0 = \dfrac{94.15}{\sqrt{\epsilon_r}(w/d + C''_f)} = \dfrac{94.15d}{\sqrt{\epsilon_r}(w + dC''_f)}$ ohms The fringing width $w_f$ is then:

(4) $\quad w_f = \dfrac{dC''_f}{2}$

By substituting $C''_f$ for $C'_f$ in Equation 2 above, and assuming $t=0$, Equation 3 becomes:

(5) $\quad C''_f = \dfrac{2}{\pi}\log_e 2 = .4412$

Substituting this value for $C'_f$ in the equation above, then Equation 4 becomes:

(6) $\quad w_f = .2206d$

Since Equation 1 and Equation 2 are valid over the range $$\frac{w}{d-t} \geq 0.35$$

for $t=0$, Equation 4 above is equally valid for $$\frac{w}{d} \geq 0.35$$

In an article, entitled "Microwave Printed Circuits—A Historical Survey" by Robert M. Barrett, page 3 of the volume above-mentioned, an experimental method utilizing the Q meter is described for measuring the capacitance per unit length of this type of transmission line.

Ordinarily, if a slot is formed in the conductor 12 of a width less than $2w_f$, the fringing fields will completely fill the slot and the characteristic impedance of the line is unchanged. Given a slot width greater than $2w_f$, the two branches of the line thus formed are no longer coupled together and are characterized by the characteristic impedance of each branch functioning separately. By choosing the point of divergence of the branch conductors 13 and 14 from the end of the conductor 12 to coincide with a spacing $2w_f$ between the branch conductors as shown, the fields couple together as illustrated particularly in Fig. 3(b). Any further divergence produces a decoupling between the fields as illustrated in Fig. 3(c). In accordance with the invention then, the spacing between the branch conductors 13 and 14 must be $\geq 2w_f$ to the right as shown of the points B—B', and $\leq 2w_f$ to the left as shown of the points B—B'. Of course, if the spacing to the left of the points B—B' is maintained equal to $2w_f$, the virtual point A of divergence of the adjacent edges of the conductors 13 and 14 may be considered to be at infinity to the left as shown.

*Description and operation of the circuit in Figs. 4 and 5*

The circuit in Fig. 4 is generally similar to the corresponding portion of the circuit illustrated in Fig. 2 with the exception of the tapered slot 18 formed in the main inner conductor 12. Accordingly, corresponding elements are indicated by identical reference numerals. The spacing between the adjacent edges of the conductors 13 and 14 along the line B—B' is still $2w_f$ as indicated. The taper converging to the point A' further reduces reflections in the main transmission line.

In the parallel transmission line circuit of Fig. 5 the two branch members have the same characteristic impedance as the main transmission line. Here a pair of impedance transformers comprising tapered conductors 21 and 22 of length $T > \lambda/2$ couple a pair of branch inner conductors 19 and 20 to the main inner conductor 12 through planar coupling transformer conductor means 21 and 22. The transformers 21 and 22 are tapered as shown to effectively match the characteristic impedance $Z_0$ associated with the branch conductors 19 and 20 to the characteristic impedance $Z_0$ of the main inner conductor 12 in accordance with the well-known transmission line theory. Impedance matching is here required since the conductors 12, 19 and 20 provide transmission lines with the same characteristic impedances $Z_0$.

In Fig. 6 the voltage standing wave ratio VSWR produced by a prior art T junction is compared with that exhibited by a parallel circuit embodying the present invention. The curve 34 represents the T junction and the curve 35 a parallel circuit of the type illustrated in Fig. 5. Both junctions were designed for operation at 9.375 kilomegacycles. The value of the junction embodying the present invention is further appreciated when it is realized that a transmission line of this type when measured without the parallel circuit exhibited a VSWR $\cong 1.04$. It will be apparent that small variations in VSWR are intolerable in complicated transmission line circuitry, particularly for receiver applications.

*Description and explanation of the antenna systems of Figs. 7 and 8*

In the antenna system of Fig. 7 a pair of outer conductors 23 and 24 provide ground planes as shown. A main, inner conductor 25 provides a main transmission line with characteristic impedance $Z_0$ to feed four resonant slot radiators 26 formed at the outer conductor 23 as shown. Each slot is fed by branch inner conductors 27 providing branch transmission lines having a characteristic impedance of $4Z_0$, four times that of the characteristic impedance $Z_0$ of the main transmission line provided by conductor 25. The main, inner conductor 25 is connected to a sub-main inner conductor 28 having a characteristic impedance $4/3Z_0$ and to a branch inner conductor 27. The adjacent edges of the conductors 27 and 28 are separated by $2w_f$ at the point of connection to the main inner conductor 25 as shown. The sub-main conductor 28 is connected to another sub-main inner conductor 29 having a characteristic impedance of $2Z_0$ and to a branch inner conductor 27 as shown. Here again, the adjacent edges of the conductors 27 and 29 are separated by a distance $2w_f$ at the point of connection at the end of the conductor 28. Sub-main inner conductor 29 is connected to two branch inner conductors 27 as shown. The adjacent edges of the conductors 27 are separated by a spacing $2w_f$ at the point of connection at the end of the conductor 29. The slots 26 are each surrounded by four shorting pins 30 which connect the outer conductors 23 and 24.

Because the outer conductors 23 and 24 are common to all parts of the transmission system, it will be apparent that the inner conductors each define a transmission line. The limiting factor on minimum spacing is the effective electrical width $w_f$ of the fringe fields associated with the conductor edges. Impedance-wise, the parallel transmission line circuit must satisfy the fundamental relation:

(7) $\quad \dfrac{1}{Z_0} = \dfrac{1}{Z_1} + \dfrac{1}{Z_2} + \cdots + \dfrac{1}{Z_n}$ Where $Z_0$=the characteristic impedance of the main transmission lines and $Z_1, Z_2 \ldots, Z_n$=the characteristic impedances of the branch transmission lines, but for only two branches Equation 7 reduces to:

(8) $$Z_0 = \frac{Z_1 Z_2}{Z_1 + Z_2}$$

Here assuming a characteristic impedance of $4Z_0$ associated with each branch inner conductor 27, the characteristic impedances $Z_x$ for each of the main and sub-main transmission lines may be readily calculated. Thus, for conductor 29:

$$Z_x = \frac{4Z_0 \times 4Z_0}{4Z_0 + 4Z_0} = 2Z_0$$

For conductor 28:

$$Z_x = \frac{2Z_0 \times 4Z_0}{2Z_0 + 4Z_0} = 4/3 Z_0$$

and for conductor 25:

$$Z_x = \frac{4/3 Z_0 \times 4Z_0}{4/3 Z_0 + 4Z_0} = Z_0$$

But, from Equation 7 above, $Z_x$ for conductor 25 is:

$$\frac{1}{Z_x} = \frac{1}{4Z_0} + \frac{1}{4Z_0} + \frac{1}{4Z_0} + \frac{1}{4Z_0} = \frac{1}{Z_0}$$

and $$Z_x = Z_0$$

Hence, all four branch conductors 27 can be directly connected to the end of conductor 25 without the use of the sub-main conductors 28 and 29. It will be apparent that the particular configuration of the parallel transmission line circuit may be varied greatly in accordance with the physical requirements of a given system. It is to be noted, however, that an outer edge of each of the first three branch conductors 27, counting from the left as shown, diverges from its respective main or sub-main conductor 25, 28 or 29. The virtual points of divergence of the adjacent edges of the sub-main conductors and the branch conductors precede the points of divergence of the outer edges of the corresponding branch conductors.

In the modified antenna system of Fig. 8, a main inner conductor 31 is connected to branch transformers 32 and 33. The transformers 32 and 33 are each connected to a pair of branch inner conductors 27. Here the main inner conductor 31 is associated with a higher characteristic impedance $2Z_0$. Matching transformers here comprise tapered conductors of length $T \geq \lambda/2$ to match the impedance $2Z_0$ presented by each pair of branch conductors 27 to the main inner conductor 31. The two antenna systems as shown are distinguishable in that Fig. 7 presents a trunk line from which a plurality of branch inner conductors emanate. In Fig. 8, a trunk line is divided into a plurality of main branch lines from which a plurality of branch inner conductors emanate. Impedance matching transformers shown in the latter system may be effectively utilized with either system.

While applicant does not intend to be limited to any particular sizes of parts in the embodiment of the invention just described, there follows a set of dimensions for the more important circuit elements which have been found to be particularly suitable for an antenna system of the type represented in Fig. 7:

For use at 9.375 kilomegacycles:

Slots 26 are .062 inch wide and .750 inch long for a characteristic impedance of 90 ohms;
Branch conductors 27—.031 inch wide;
Conductor 29—.116 inch wide;
Conductor 28—.202 inch wide;
Conductor 25—.288 inch wide;
All conductors are formed from copper foil .00135 inch thick.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A parallel transmission line circuit comprising: a pair of outer planar conductors providing ground planes; a main, inner, planar conductor held in insulated spaced relation between said outer conductors and of such width as to provide a main transmission line having a first characteristic impedance; a first branch, inner conductor co-planar with and connected to said main inner conductor and having a lesser width than said main inner conductor to provide a first branch transmission line with a second characteristic impedance; and a second branch, inner, planar conductor co-planar with and connected to said main inner conductor and having a lesser width than said main inner conductor to provide a second branch transmission line with a third characteristic impedance, at least one of said branch inner conductors diverging from said main inner conductor with the virtual point of divergence of adjacent edges of said branch conductors preceding the point of divergence of an outer edge of said branch conductors whereby energy propagated in said main transmission line may be divided between said branch transmission lines without introducing extraneous reflections.

2. A parallel transmission line circuit comprising: a pair of outer planar conductors providing ground planes; a main, inner, planar conductor held in insulated spaced relation between said outer conductors and of such width as to provide a main transmission line having a first characteristic impedance; a first branch, inner conductor co-planar with and coupled to said main inner conductor to provide a first branch transmission line with a second characteristic impedance; and a second branch, inner planar conductor co-planar with and coupled to said main inner conductor to provide a second branch transmission line with a third characteristic impedance, at least one of said branch inner conductors diverging from said main inner conductor with the virtual point of divergence of adjacent edges of said branch conductors preceding the point of divergence of an outer edge of said branch conductors whereby energy propagated in said main transmission line may be divided between said branch transmission lines without introducing extraneous reflections.

3. A parallel transmission line circuit comprising: a pair of outer planar conductors providing ground planes; a main, inner, planar conductor held in insulated spaced relation between said outer conductors and of such width as to provide a main transmission line having a first characteristic impedance; a first branch, inner conductor co-planar with said main inner conductor to provide a first branch transmission line with a second characteristic impedance; a second branch, inner planar conductor co-planar with said main inner conductor to provide a second branch transmission line with a third characteristic impedance; a first planar branch transformer means connecting said main and said first branch inner conductors for matching said first and second impedances; and a second planar branch transformer means connecting said main and said second branch inner conductors for matching said first and third impedances, at least one of said branch inner conductors or said branch transformer means diverging from said main inner conductor with the virtual point of divergence of adjacent conductor edges preceding the point of divergence of an outer co-planar conductor edge whereby energy propagated in said main transmission line may be divided between said branch transmission lines without introducing extraneous reflections.

4. A parallel transmission line circuit comprising: a pair of outer, planar conductors providing ground planes;

an inner, planar conductor held in insulated spaced relation between said outer conductors and of such width as to provide a main transmission line having a first characteristic impedance; a first branch, inner, planar conductor co-planar with and connected to said main inner conductor and having a lesser width than said main inner conductor to provide a branch transmission line with a second characteristic impedance; a second branch, inner, planar conductor co-planar with and connected to said main inner conductor and having a lesser width than said main inner conductor to provide a branch transmission line with a third characteristic impedance, at least one of said branch inner conductors diverging from said main inner conductor; and an open-ended slot formed at the end of said main inner conductor providing a spacing at the point of divergence of an outer edge of one of said branch inner conductors between the connections of said main and said first branch conductors and said main and said second branch conductors of twice the effective electrical width of capacitive fringe fields associated with the adjacent edges of said inner conductors whereby energy propagated in said first transmission line may be divided between said branch transmission lines without introducing extraneous reflections.

5. A parallel transmission line circuit comprising: a pair of outer, planar conductors providing ground planes; an inner, planar conductor held in insulated spaced relation between said outer conductors and of such width as to provide a main transmission line having a first characteristic impedance; a first branch, inner planar conductor co-planar with and connected to said main inner conductor and having a lesser width than said main inner conductor to provide a first branch transmission line with a second characteristic impedance; a second branch, inner, planar conductor co-planar with and connected to said main inner conductor and having a lesser width than said main inner conductor to provide a second branch transmission line with a third characteristic impedance, at least one of said branch inner conductors diverging from said main inner conductor; and a tapered slot formed at the end of said main inner conductor providing a spacing at the point of divergence of an outer edge of one of said branch inner conductors between the connections of said main and said first branch conductors and said main and said second branch conductors of twice the effective electrical width of capacitive fringe fields associated with the edges of said conductors whereby energy propagated in said first transmission line may be divided between said branch transmission lines without introducing extraneous reflections.

6. A parallel transmission line circuit, comprising: a planar, outer conductor providing a ground plane; an elongated, main inner conductor held in parallel and in insulated spaced relation with said outer conductor, said inner conductor being narrower than said outer conductor and of such width as to provide a main transmission line having a first characteristic impedance; a first branch inner conductor held in parallel and in insulated spaced relation with said outer conductor and coupled to said main inner conductor to provide a first branch transmission line with a second characteristic impedance; and a second branch inner conductor held in parallel and in insulated spaced relation with said outer conductor and coupled to said main inner conductor to provide a second branch transmission line with a third characteristic impedance, an outer edge of a branch inner conductor diverging from said main inner conductor from a point coincident with or succeeding that point where the separation between the inner edges of the branch conductors is not less than the effective electrical width of the capacitive fringing fields associated with the adjacent edges of said branch conductors, whereby energy propagated in said main transmission line may be divided between said branch transmission lines without introducing extraneous reflections.

7. A parallel transmission line circuit, comprising: a planar, outer conductor providing a ground plane; an elongated, main inner conductor held in parallel and in insulated spaced relation with said outer conductor, said inner conductor being narrower than said outer conductor and of such width as to provide a main transmission line having a first characteristic impedance; a first branch inner conductor held in parallel and in insulated spaced relation with said outer conductor coplanar with and connected to said main inner conductor to provide a first branch transmission line with a second characteristic impedance; and a second branch inner conductor held in parallel and in insulated spaced relation with said outer conductor coplanar with and connected to said main inner conductor to provide a second branch transmission line with a third characteristic impedance, an outer edge of a branch inner conductor diverging from said main inner conductor from a point coincident with or succeeding that point where the separation between the inner edges of the branch conductors is not less than the effective electrical width of the capacitive fringing fields associated with the adjacent edges of said branch conductors, whereby energy propagated in said main transmission line may be divided between said branch transmission lines without introducing extraneous reflections.

8. A parallel transmission line circuit, comprising: a pair of planar outer conductors providing ground planes; an elongated, main inner conductor held in parallel and in insulated spaced relation between said outer conductors, said inner conductor being narrower than said outer conductors and of such width as to provide a main transmission line having a first characteristic impedance; a first elongated, planar, branch inner conductor held in parallel and in insulated spaced relation between said outer conductors coplanar with and connected to said main inner conductor to provide a first branch transmission line with a second characteristic impedance; and a second branch inner conductor held in parallel and in insulated spaced relation between said outer conductors coplanar with and connected to said main inner conductor to provide a second branch transmission line with a third characteristic impedance, an outer edge of a branch inner conductor diverging from said main inner conductor from a point coincident with or succeeding that point where the separation between the inner edges of the branch conductors is not less than the effective electrical width of the capacitive fringing fields associated with the adjacent edges of said branch conductors, whereby energy propagated in said main transmission line may be divided between said branch transmission lines without introducing extraneous reflections.

References Cited in the file of this patent
UNITED STATES PATENTS 2,602,856    Rumsey _____ July 8, 1952

OTHER REFERENCES

"IRE Transactions on Microwave Theory and Techniques," vol. MTT 3, No. 2, March 1955, pages 157–161. (Copy in Div. 69.)